8709X
I. McNary,
Grate.
Patented Mar. 24, 1835.
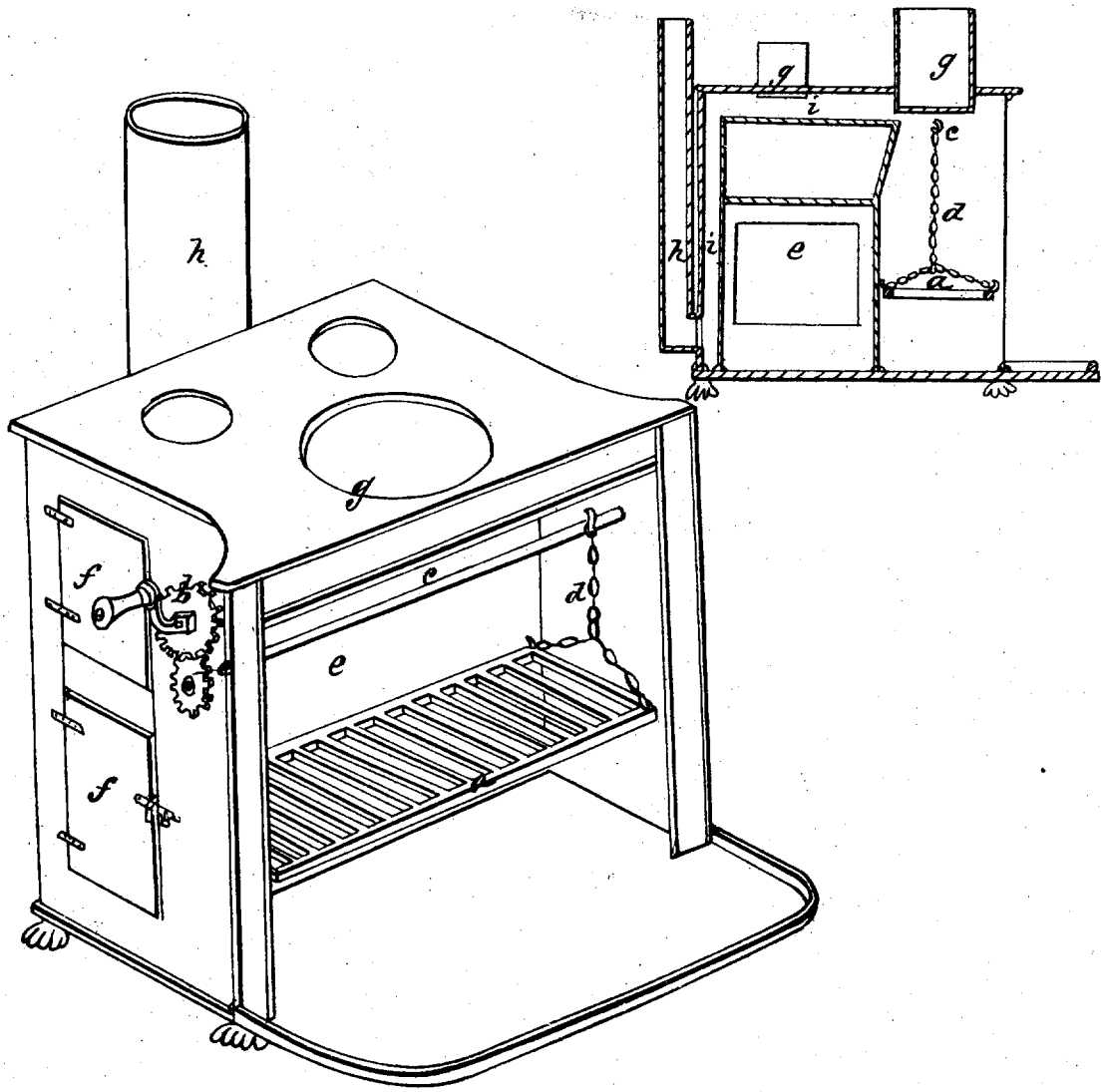

Mar. 24. 1835 8709X

Isaac McNary

Letters Patent

The Schedule referred to in these letters patent and making part of the same containing a description in the words of the said Isaac McNary himself of his improvement in the Franklin Cooking Stove To all to whom these Presents shall come.

Be it Known that I Isaac McNary of the Town of Stafford County of Tolland and State of Connecticut have invented a new and useful improvement in the Franklin Cooking Stove denominated the improved Cook Franklin Stove: and that the following is a full and exact description thereof. – In the front part of the Stove is a moveable grate & hearth upon which the fuel is placed. Directly back is the oven which opens by a door on each side of the Stove. Upon the top are placed three kettles one of a larger and two of a smaller size. the larger kettle is placed near the centre in the forward part of the stove. and the two smaller ones near the back part of the stove. The pipe is placed at the back part of the stove. The fire and smoke passes from the grate below the Kettle and above the ovens then descends behind the oven and goes into the pipe at the side of the Stove there is a crank to which there is affixed a wheel turning a shaft which goes across the stove under the large kettle to which at each end chains are appended which chains are united to the shaft and fastened to the grate. By turning the crank the wheel and shaft are also turned which winds the chain around the shaft by means of which the grate and hearth upon which the fuel is placed is drawn up and lowered at pleasure. communicating more or less heat to the kettles and other parts of the stove. What I claim as my own invention and improvement not previously known in the above described stove is the lowering and raising of the grate & hearth at pleasure by means of the above mentioned Drawing not.

442. 9709X wheel shaft and chain which raises and lowers a sixth plate of Heath
containing the fire at pleasure, thereby giving a greater or less quan-
tity of heat with the same quantity of fuel. Dated at Stafford
the 31st day of January 1835

Witnesses

Rudolphus Modworth  Isaac Mc Nary

Francis R Modworth

Ent:

406 rds cfyW